C. L. SCHWARZ.
WHEEL.
APPLICATION FILED APR. 4, 1911.
1,027,158.
Patented May 21, 1912.
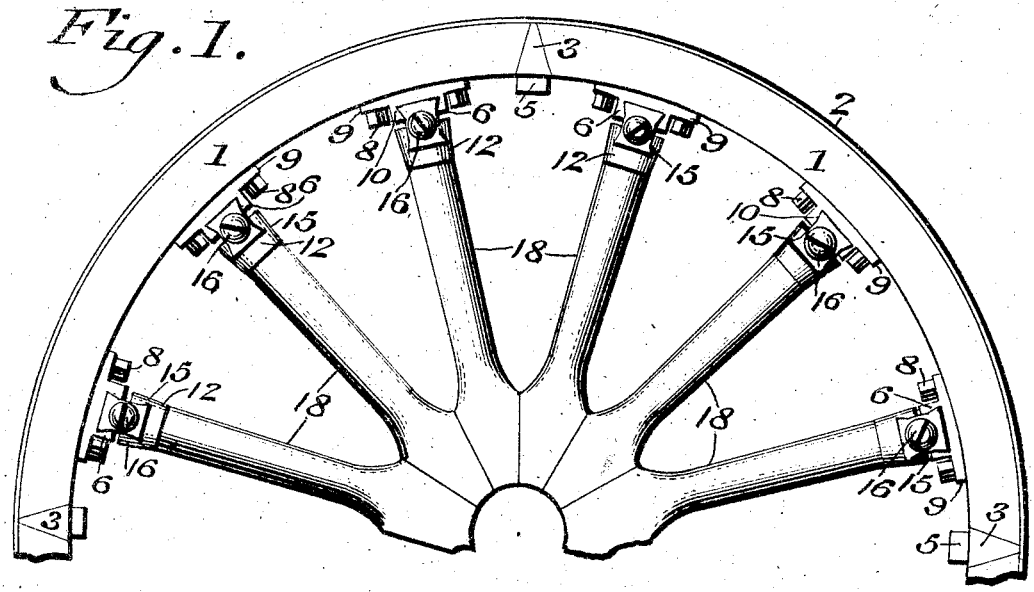
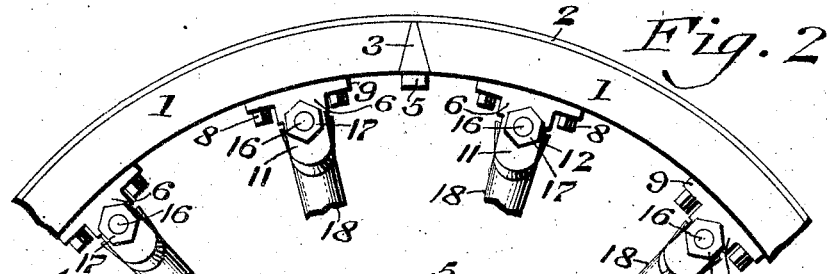
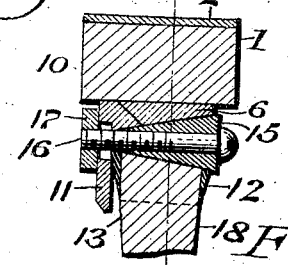
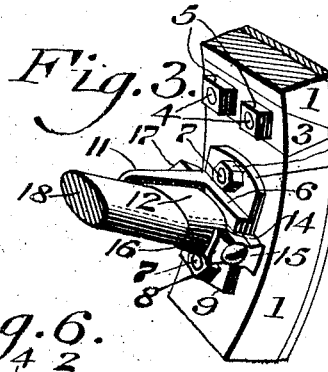
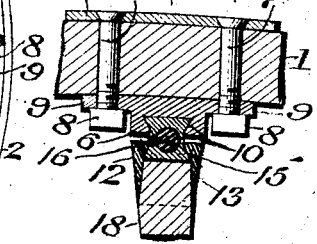
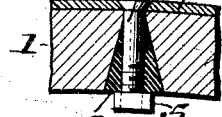
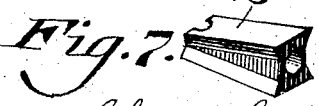
WITNESSES
P. F. Nagle
L. Douville
INVENTOR
Charles L. Schwarz
BY Wiedersheim & Fairbanks
ATTORNEYS

UNITED STATES PATENT OFFICE.

CHARLES L. SCHWARZ, OF PHILADELPHIA, PENNSYLVANIA.

WHEEL.

1,027,158. Specification of Letters Patent. Patented May 21, 1912.

Application filed April 4, 1911. Serial No. 618,835.

*To all whom it may concern:*

Be it known that I, CHARLES L. SCHWARZ, a citizen of the United States, residing in the city and county of Philadelphia, State of Pennsylvania, have invented a new and useful Wheel, of which the following is a specification.

My invention consists of improved means for taking up any shrinkage which may take place at the joint between the rim and spokes of a wheel.

It further consists of improved means for taking up shrinkage of the rim of the wheel.

It further consists of other novel features of construction, all as will be hereinafter fully set forth.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a side elevation of a portion of a wheel provided with my improvement. Fig. 2 represents a side elevation of the opposite side of a portion of such wheel. Fig. 3 represents a perspective view of a portion of the felly and a spoke of a wheel embodying my invention. Fig. 4 represents a section of the felly and spoke on the line x—x in Fig. 5. Fig. 5 represents a section at right angles to that in Fig. 4, and on the line y—y in said figure. Fig. 6 represents a section of the ends of two felly sections embodying my invention. Fig. 7 represents a perspective view of the tightening wedge.

Similar numerals of reference indicate corresponding parts in the figures.

Referring to the drawings, 1 designates the felly sections which constitute the rim of the wheel, and 2 designates the tire secured to said rim. The meeting ends of the felly sections are slightly beveled, and wedges, 3, are inserted in the spaces between such beveled ends to fill such spaces, and are secured by screw-bolts, 4, the heads of which are countersunk in the tire while the shanks pass through holes in the wedges and have nuts, 5, upon their threaded ends, by means of which the wedges may be drawn into the wedge-shaped openings between the beveled ends of the felly sections to expand the same tightly against the tire. Blocks, 6, are secured by means of screw-bolts, 7, having nuts, 8, passed through the tire and felly sections, and through perforated ears, 9, upon the blocks. Said blocks have grooves, 10, transverse to the felly sections and formed with inclined bottoms, and each block has a perforated lip, 11, projecting at the shallow end of the groove. The outer ends of the spokes, 18, have open ferrules, 12, and said ends, 13, are cut inclined to correspond to the inclined grooves, the ferrules being cut or notched, at 14, at the ends of the inclined faces of the spokes. Wedges, 15, are placed to have their inclined sides bear against the inclined bottoms of the grooves and the inclined faces of the spokes, and screw-bolts, 16, pass through longitudinal bores in said wedges, and their threaded ends project through the narrow end of the wedges and through the perforated lips of the blocks, and nuts, 17, fit upon the threaded ends and bear against the perforated lips to draw the wedges into their wedge-shaped seats.

The grooves 10 in the blocks and the grooves formed by the inclined ends 13 of the spokes and the notches 14 in the ferrules are dovetailed, and the sides of the wedges are correspondingly dovetailed, so that the wedges will be retained in place between the blocks and the spokes and said parts will be held together by the wedges.

By means of the wedges between the beveled ends of the felly sections, the rim may be expanded if the wood in the felly sections shrinks, and if the spokes shrink, such shrinkage may be taken up by drawing the wedges in between the blocks or seats upon the felly sections and the inclined ends of the spokes. It will be further apparent that by my invention, the felly sections can be removed from the spokes in case it is desired to change the tires, and another tire applied.

Having thus described my invention what I claim as new and desire to secure by Letters Patent is:—

In a device of the character stated, a felly, a block secured upon said felly and formed with a groove transverse to the felly and having an inclined bottom and dovetailed sides and also formed with an upright perforated lip at the shallow end of the groove, a spoke having an inclined end, a ferrule upon said end and having notches to form with said inclined end a groove having an inclined bottom and dovetailed sides, a wedge having dovetailed sides and fitting into said inclined and dovetailed grooves, and a screw-bolt passed through a longitudinal bore in the wedge and through the perforated lip and having a nut for drawing it and the wedge between the inclined grooves.

CHARLES L. SCHWARZ.

Witnesses:
E. HAYWARD FAIRBANKS,
JOHN A. WIEDERSHEIM.